June 9, 1959 C. H. HOLSCLAW 2,889,946
BOAT TRAILER
Filed Nov. 15, 1956 2 Sheets-Sheet 1
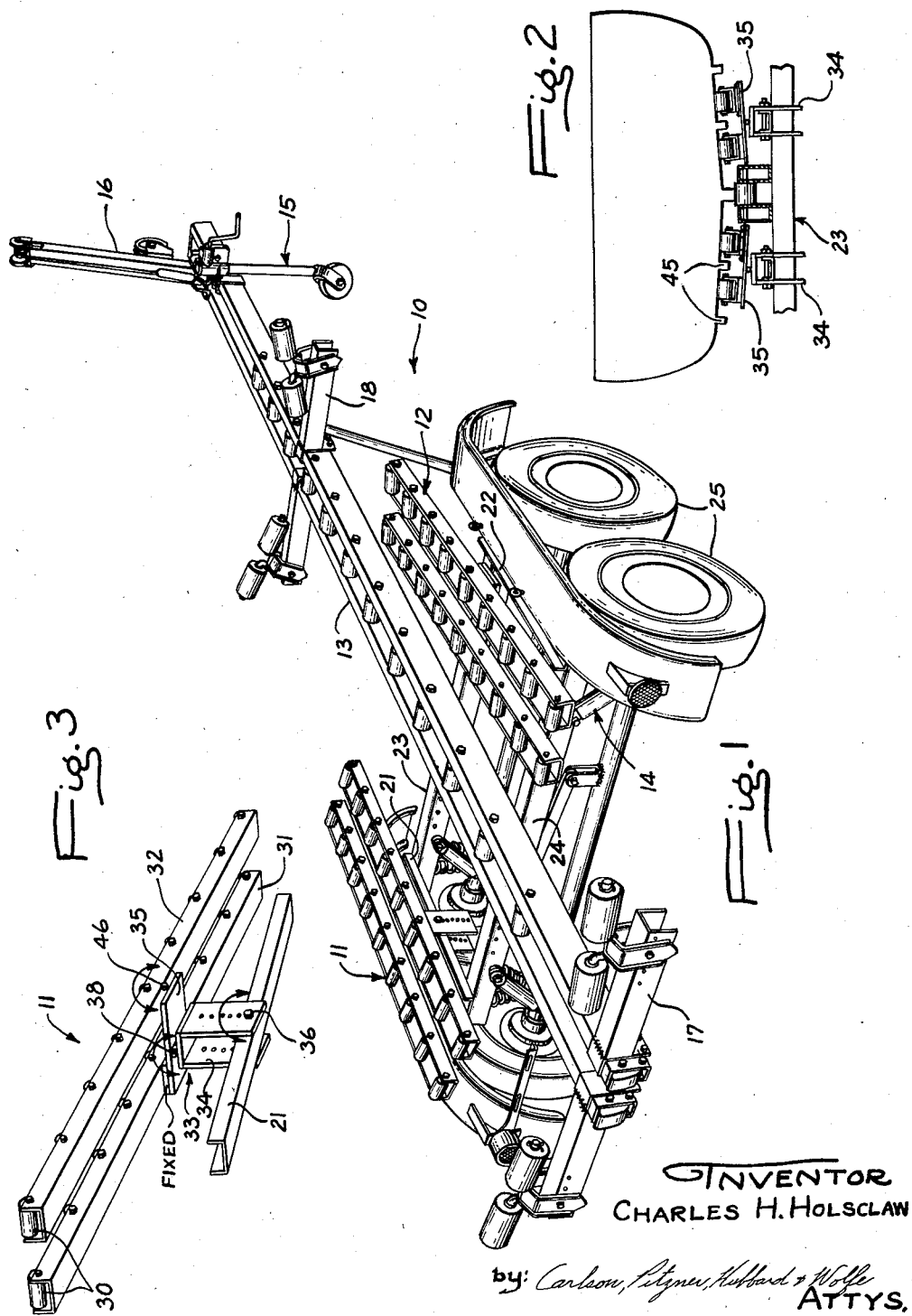
INVENTOR
CHARLES H. HOLSCLAW
by: Carlson, Pitzner, Hubbard & Wolfe
ATTYS.

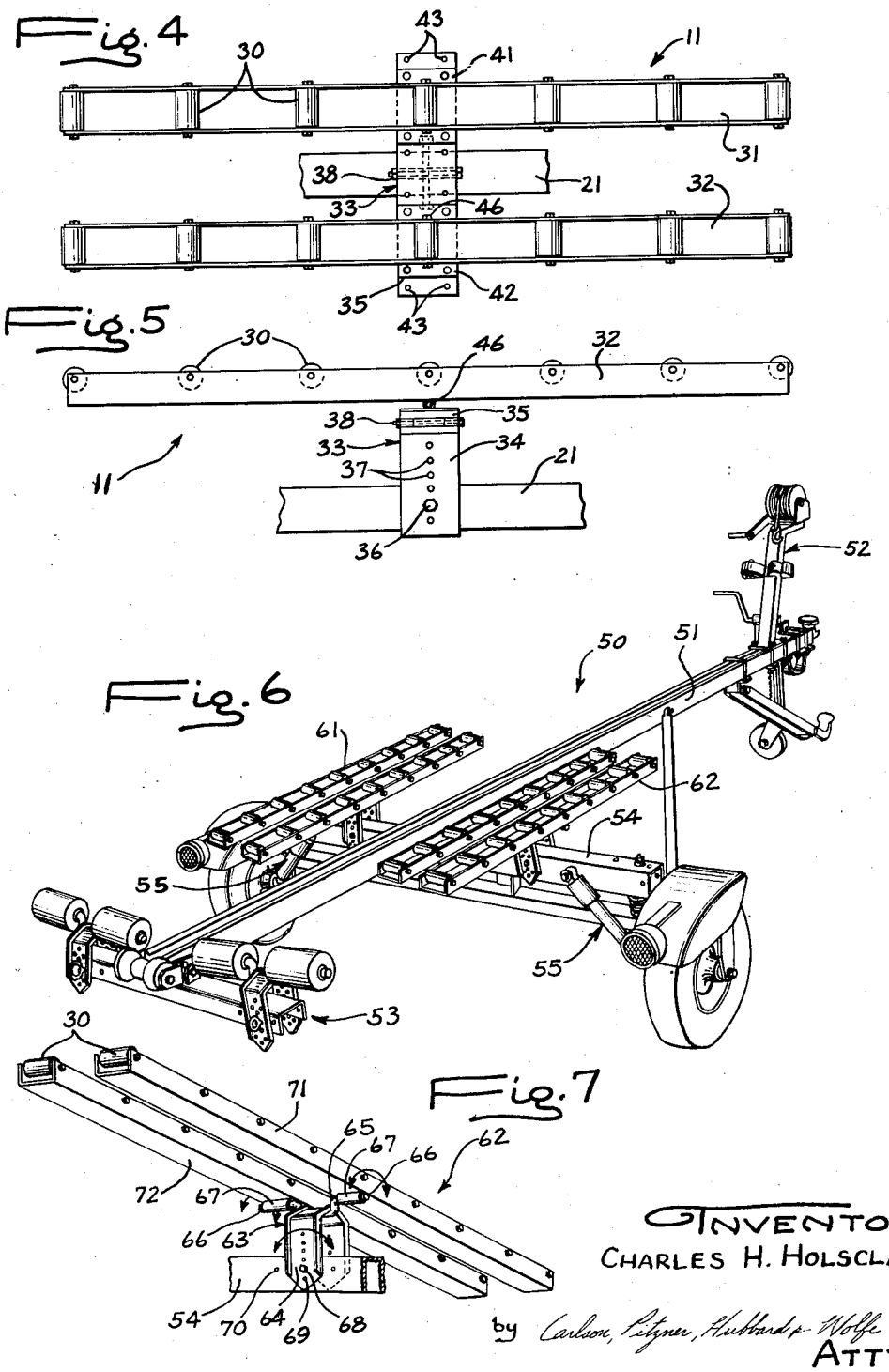

United States Patent Office 2,889,946
Patented June 9, 1959

2,889,946

BOAT TRAILER

Charles H. Holsclaw, Evansville, Ind.

Application November 15, 1956, Serial No. 622,483

8 Claims. (Cl. 214—84)

This invention relates to boat carrying trailers and more particularly to a novel support that is adapted to engage and cradle a boat on a trailer.

It is readily apparent that a boat carrying trailer should provide firm extensive support for a boat hull so that the entire weight of the boat is not concentrated at a few spaced points of support. In addition the support should be able to automatically conform to the changing contour of the boat hull as it slides onto and off of the trailer. Also the friction between the supports and the boat bottom should be kept to a minimum to avoid hull damage and to make loading and unloading as easy as possible. Furthermore, it is desirable for a given trailer to be able to handle a wide variety of boat hulls in common use. Combining these features into a single design has been the difficult goal of the art.

Accordingly, it is an object of the invention to provide an improved boat trailer capable of nesting a boat between members automatically accommodating to the hull configuration and which provides extensive hull support both laterally and longitudinally of the boat keel.

It is additionally an object to provide an improved trailer permitting a boat to be more easily loaded and unloaded. In more detail, it is an object to ease the loading and unloading operation by reducing the friction between the trailer and boat and by distributing the boat weight over greater supporting surfaces that automatically adjust to conform to the sliding boat hull.

It is a further object to provide an improved boat trailer having the above characteristics that is strong and rugged but which is simply and economically constructed.

Other objects and advantages of the invention will become apparent upon reading the attached detailed description and upon reference to the drawings in which:

Figure 1 is a perspective view of a boat trailer constructed according to the invention.

Fig. 2 is a fragmentary sectional view of the trailer shown in Fig. 1, showing an end view of the novel boat support.

Fig. 3 is a lower perspective view of a single boat support, showing its several pivotal movements.

Fig. 4 is a top view of the support shown in Fig. 3.

Fig. 5 is a side view of the support shown in Fig. 4.

Fig. 6 is a perspective view of a modification of the boat trailer.

Fig. 7 is a lower perspective view of a single boat support of the modification shown in Fig. 6.

While the invention will be described in connection with certain preferred embodiments, it will be understood that I do not intend to limit the invention to such embodiments but, on the contrary, intend to cover such alternative embodiments and constructions as may be included within the spirit and scope of the appended claims.

Turning now to Fig. 1, there is shown a trailer 10 having two boat supports 11, 12 constructed according to the invention. Generally, the trailer 10 comprises a tongue 13 mounted on a tandem wheel axle assembly 14. A fifth wheel 15 supports the trailer when it is not attached to a towing vehicle. A winch assembly 16 is carried at the forward end of the tongue 13 and an adjustable transom support 17 is mounted at the rearward end of the tongue. Carried behind the winch assembly 16 is an adjustable bow support 18. The tongue 13, transom support 17, and bow support 18 all carry rubber rollers which support portions of the boat and allow the bottom to roll easily onto and off of the trailer. To cradle the boat centrally and support a major portion of the boat's weight, the supports 11 and 12 are mounted on longitudinally extending frame members 21 and 22 which, in turn, are carried on the frame members 23, 24. The latter are spring-supported on axles which mount the supporting wheels 25.

In accordance with the present invention the central boat supports 11, 12 comprise banks of laterally spaced rollers journalled in teter-totter frames extending longitudinally of the trailer with each roller frame being carried by a bracket providing a universal joint that allows the roller bank to tilt laterally as well as rock fore and aft, thereby to provide a self accommodating plane of support on each side of the longitudinal trailer axis.

Since each of the supports 11, 12 are identical, only support 11 will be described in detail and for this purpose reference is made to Figs. 3, 4 and 5. As therein shown, the support 11 includes two banks of rollers 30 rotatably carried in frames formed by channels 31, 32. The upper surface of rollers 30 are alined so that each bank of rollers define a firm single plane of support. To guard against hull damage while loading and unloading the boat, the end rollers in each bank extend slightly beyond the edges of their respective channels 31, 32 so that the boat hull cannot strike a sharp corner when rolling onto the support 11.

For the purpose of pivotally and adjustably mounting the channels 31, 32 a bracket 33 is provided. The bracket comprises an inverted U-shaped yoke 34 and a platform 35. The yoke 34 straddles frame member 21 and is pivoted thereto by a pivot pin 36 which may be passed through any set of the plurality of vertically spaced holes 37 formed in the depending legs of the yoke. Thus, the height of support 11 above the trailer frame can be adjusted by positioning the pin 36 through a particular set of holes 37 and the single pivot pin allows the support to tilt in a longitudinal plane.

To permit the banks of rollers 30 to tilt in a transverse plane, the platform 35 is pivoted to the top of yoke 34 by a longitudinally extending pivot pin 38. The platform 35 can thus conform to the contour of the boat's ribs as shown in Fig. 2. The roller supporting channels 31, 32 are attached to the mounting plates 41, 42, respectively, and these plates are in turn adjustably secured to the top of platform 35. As can be seen in Fig 4, the platform 35 has several sets of holes 43 therethrough, positioned so that the plates 41, 42 can be bolted in any one of several locations along the platform. The adjustable spacing of the channels 31, 32 is of substantial significance in that it permits the trailer to support boats having bilge keels, such as keels 45 shown in Fig. 2.

One further pivot point is provided so that the two channels 31, 32 can tilt in a longitudinal plane independently of each other. A pivot pin 46 secures channel 30 to its plate 42 and thus permits the channel to tilt in a longitudinal plane independent of the bracket 33. The channel 31 is rigidly secured to its mounting plate 41 and therefore a bending moment of force exerted on the rollers 30 carried by channel 31 will cause the entire bracket assembly to tilt around the pivot pin 36. Since the channels 31, 32 are laterally spaced, the proper supporting angle for channel 31 about the pivot pin 36 may not be correct for channel 32. However, the pivot pin 46 permits the channel 32 to assume the proper inclination. The various permissible tilting motions of the bracket 33 are shown by the curved arrows in Fig. 3.

A modification of the invention is shown mounted on a somewhat smaller trailer 50 in Fig. 6. The trailer 50 comprises a tongue 51 carrying a winch and bow support assembly 52 and a transom support 53. An inverted channel frame member 54 supports the tongue 51 on a two wheel axle assembly 55. Modified boat supports 61, 62 constructed according to the invention, are mounted on channel member 54 at either side of the tongue 51. Each of the supports 61, 62 are alike and therefore only one will be described in detail. The support 62 comprises two channels 71, 72 within each of which is carried a bank of rollers 30. To permit the roller banks to be tilted to boat conforming angles, a pivotable bracket 63 is provided for the channels. The bracket 63 comprises a yoke 64 and rod 65 rigidly secured thereto that flares up and outwardly to define two alined pivot portions 66. Secured to the underside of each channel 71, 72 is a sleeve 67 which is rotatably and slidably mounted on the pivot portion 66 of rod 65. The yoke 64 straddles frame member 54 and a pivot pin 68 secures it thereto. The bracket 63 therefore allows the channels to tilt in a transverse plane about pivot pin 68 and in a longitudinal plane about the pivot portions 66 of rod 65. These tilting motions are indicated by the curved arrows in Fig. 7.

Positional adjustment of the support 62 is made possible by providing yoke 64 with a plurality of alined holes 69 so that pin 68 can be passed through any desired set. The frame member 54 also has a spaced series of holes 70 so that the height of the support and its lateral position can be set by selecting the proper combination of holes 69, 70 for inserting pivot pin 68. Limited lateral shifting of the channels 71, 72 on rod 65 is also possible and a cotter pin is passed through each end of the rod 65 so that the sleeve 67 can carry the channels along, but not off of, the rod pivot portion 66.

It will be appreciated that the various pivot points of the roller bank supporting brackets combine to provide a complete universal joint for the roller banks so that they may automatically accommodate themselves to the "warped" surface of a boat bottom as the boat is rolled onto and off of the trailer. Furthermore, the bank of rollers provides firm and extensive support extending lengthwise of the boat hull. The individual rollers 30 are preferably formed of hard rubber and therefore will not scratch or otherwise damage the hull of a boat being carried by the trailer. The four banks of rollers, together with the trailer tongue, combine, as shown in Fig. 2, to cradle and support a substantial portion of the boat bottom so that the boat is not likely to sway during transport. The adjustable spacing between the various roller bank permits this same extensive support to be provided boats with bilge keels since the roller banks can be easily adjusted to allow the bilge keels to fit therebetween.

By mounting the banks of rollers in U-shaped channels a particularly strong, economical construction is achieved. The rollers can be easily journalled between the upstanding sides of the channel, and the shape of the channel gives it great strength and rigidity without undue weight.

I claim as my invention:

1. A boat supporting trailer comprising a frame, longitudinally alined banks of hull supporting rollers disposed in spaced pairs so that each pair will engage an opposite side of a boat bottom, each bank having a roller frame and a series of rollers journaled therein defining a plane of support, and supporting brackets mounted on said trailer frame for carrying the respective roller banks, said banks being pivoted to said brackets and said brackets being pivoted to said trailer frame so that the roller banks may tilt in both longitudinal and transverse planes.

2. A boat supporting trailer comprising a frame, longitudinally alined banks of hull supporting rollers disposed in spaced pairs so that each pair will engage an opposite side of a boat bottom, each bank having a roller frame and an extending series of rollers journaled therein defining a plane of support, and supporting brackets mounted on said frame for carrying the respective roller banks, said brackets having interconnecting parts forming a universal joint connection so that the roller banks carried thereby may tilt in both longitudinal and transverse planes.

3. A boat supporting trailer comprising a frame, longitudinally alined banks of hull supporting rollers disposed in laterally spaced pairs so that each pair will engage an opposite side of a boat bottom, each bank having a roller frame and a series of rollers journaled therein defining a plane of support, supporting brackets adjustably mounted on said trailer frame for carrying the respective roller banks at selectable heights above the trailer frame and at selectable distances from the longitudinal trailer axis, said banks being pivoted to said brackets and said brackets being pivoted to said frame so that the roller banks may tilt in both longitudinal and transverse planes, and means permitting said lateral spacing of each pair of roller banks to be adjustably varied.

4. In a boat trailer having a central longitudinal axis and trailer frame members spaced on opposite sides of said axis, a boat hull support comprising, in combination, at least one unitary bank of rollers on each side of said axis and arranged parallel thereto, each bank comprising a roller frame and a series of longitudinally alined rollers journaled therein to define a plane of support, and supporting brackets for said roller frames respectively, each of said supporting brackets having a top hinge connection for central pivoting to the associated roller frame and a lower hinge connection for pivoting to the associated trailer frame member, said hinge connections being arranged at right angles so that each bank of rollers may tilt independently in both longitudinal and transverse planes.

5. In a boat trailer having a central longitudinal axis and trailer frame members spaced on opposite sides of said axis, a boat hull support comprising in combination at least one unitary bank of rollers on each side of said axis and arranged parallel thereto, each bank comprising a roller frame and a series of longitudinally alined rollers journaled therein to define a plane of support, and supporting brackets for said roller frames respectively, each of said supporting brackets having interconnecting positions providing a universal joint between said roller frame and one of said trailer frame members so that each bank of rollers may tilt independently in both longitudinal and transverse planes.

6. In a boat trailer having a central longitudinal axis and trailer frame members spaced on opposite sides of said axis, a boat hull support comprising in combination at least one unitary bank of rollers on each side of said axis and arranged parallel thereto, each bank comprising a roller frame and a series of longitudinally alined rollers journaled therein to define a plane of support, supporting brackets for said roller frames respectively, each of said supporting brackets having a top hinge connection for central pivoting to the associated roller frame and a lower hinge connection for pivoting to the associated trailer frame member, said lower hinge connection being selectively positionable so that the height of said bracket can be adjusted and being arranged at right angles to said upper hinge connection so that each bank of rollers may tilt independently in both longitudinal and transverse planes, and means to adjustably vary the distance of said roller banks from said axis.

7. In a boat trailer having frame members spaced on opposite sides of a central longitudinal axis, a boat hull support comprising, in combination, a pair of laterally spaced roller banks alined with said axis, each of said banks comprising a roller frame and a series of alined rollers journaled therein to define a plane of support, a supporting plate carrying said roller frames, said frames being positionable along said plate so as to vary the lateral spacing of the roller banks, a supporting bank having an adjustable pivotable connection with one of said trailer frame members so that the height of said bracket can be selected, at a pivotal connection between said supporting plates and said supporting bracket, said pivotal connections being at right angles so that the roller banks may tilt laterally and longitudinally with respect to the trailer.

8. In a boat trailer having frame members spaced on opposite sides of a central longitudinal axis, a boat hull support comprising, in combination, a pair of laterally spaced roller banks alined with said axes, each of said banks comprising a roller frame and a series of alined rollers journaled therein to define a plane of support, a supporting bracket having an adjustable pivotal connection with one of said trailer frame members so that the height of said bracket can be selected, and laterally extending arms secured to said bracket providing pivotal supporting connections for said roller frames, said pivotal supporting connections being at right angles to said adjustable pivotal connection so the roller banks may tilt laterally and longitudinally with respect to the trailer.

References Cited in the file of this patent

UNITED STATES PATENTS

| | | |
|---|---|---|
| 2,497,072 | Cooper | Feb. 14, 1950 |
| 2,574,857 | Ball | Nov. 13, 1951 |
| 2,586,485 | Schroeder | Feb. 19, 1952 |
| 2,676,716 | Sallis | Apr. 27, 1954 |
| 2,708,045 | Shontz | May 10, 1955 |
| 2,746,622 | Roy | May 22, 1956 |
| 2,765,180 | Albers | Oct. 2, 1956 |
| 2,788,146 | Gronlund | Apr. 9, 1957 |
| 2,789,713 | Agricola | Apr. 23, 1957 |

FOREIGN PATENTS

| | | |
|---|---|---|
| 10,667 | Great Britain | May 6, 1912 |